(12) United States Patent
Nihei

(10) Patent No.: US 12,330,713 B2
(45) Date of Patent: Jun. 17, 2025

(54) VEHICLE LOWER STRUCTURE

(71) Applicant: HONDA MOTOR CO., LTD., Tokyo (JP)

(72) Inventor: Hidefumi Nihei, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 18/167,253

(22) Filed: Feb. 10, 2023

(65) Prior Publication Data
US 2023/0257029 A1 Aug. 17, 2023

(30) Foreign Application Priority Data

Feb. 16, 2022 (JP) .................... 2022-021861

(51) Int. Cl.
| | |
|---|---|
| B62D 25/24 | (2006.01) |
| B60R 13/08 | (2006.01) |
| B62D 25/20 | (2006.01) |
| B62D 29/00 | (2006.01) |
| B62D 35/02 | (2006.01) |
| B62D 29/04 | (2006.01) |

(52) U.S. Cl.
CPC ......... *B62D 25/24* (2013.01); *B62D 25/2072* (2013.01); *B62D 29/005* (2013.01); *B60R 13/0876* (2013.01); *B62D 29/043* (2013.01); *B62D 35/02* (2013.01)

(58) Field of Classification Search
CPC .. B62D 25/2072; B62D 25/24; B62D 35/005; B62D 35/02; B60R 13/0838; B60R 13/0876
See application file for complete search history.

(56) References Cited

U.S. PATENT DOCUMENTS

| | | | | |
|---|---|---|---|---|
| 6,435,298 B1* | 8/2002 | Mizuno | ................. | B62D 35/02 296/180.1 |
| 2002/0195842 A1* | 12/2002 | Kruschhausen | ....... | B62D 35/02 296/204 |
| 2009/0102220 A1* | 4/2009 | Oshio | ................. | B60K 15/063 296/39.1 |
| 2011/0163570 A1* | 7/2011 | Takeuchi | ............... | B62D 35/02 296/181.5 |
| 2013/0181476 A1* | 7/2013 | Naoi | ..................... | B62D 35/02 296/180.1 |
| 2013/0285416 A1* | 10/2013 | Fukushi | ................. | B62D 25/20 296/204 |

(Continued)

FOREIGN PATENT DOCUMENTS

| | | |
|---|---|---|
| JP | 2006-327429 A | 12/2006 |
| JP | 2024064208 A * | 5/2024 |

*Primary Examiner* — Gregory A Blankenship
(74) *Attorney, Agent, or Firm* — Rankin, Hill & Clark LLP

(57) ABSTRACT

A vehicle lower structure includes an under cover. The under cover includes: a cover body located under an exhaust pipe and installed on a vehicle body; a lid detachably attached to the cover body and configured to close a work hole penetrating the cover body in an upper-lower direction when the lid is attached to the cover body and to open the work hole when the lid is detached from the cover body; and a baffle made of a metal material and installed in an area of an upper surface of the lid that includes a portion closest to the exhaust pipe and its surroundings.

4 Claims, 5 Drawing Sheets

(56) References Cited

U.S. PATENT DOCUMENTS

| | | | |
|---|---|---|---|
| 2015/0021951 A1* | 1/2015 | Maurer | B60K 11/06 296/180.1 |
| 2016/0332668 A1* | 11/2016 | Pienkohs | B62D 25/2036 |
| 2017/0021734 A1* | 1/2017 | Birkholz | B60L 53/12 |
| 2020/0070895 A1* | 3/2020 | Greggs | B62D 25/2072 |
| 2020/0102020 A1* | 4/2020 | Fujisawa | B62D 25/24 |
| 2022/0260149 A1* | 8/2022 | Lee | F16H 57/031 |
| 2024/0075990 A1* | 3/2024 | Nakamura | B62D 25/20 |
| 2025/0002092 A1* | 1/2025 | Sykes | B60L 50/60 |

* cited by examiner

VEHICLE LOWER STRUCTURE

CROSS-REFERENCE TO RELATED APPLICATION

This application claims the benefit of foreign priority to Japanese Patent Application No. 2022-021861, filed Feb. 16, 2022, which is incorporated by reference in its entirety.

TECHNICAL FIELD

The present invention relates to a vehicle lower structure including an under cover that constitutes a bottom surface of an engine compartment.

BACKGROUND ART

An under cover is conventionally provided at a bottom portion of an engine compartment to protect equipment in the engine compartment from stones and foreign objects flying up from road surface while a vehicle is traveling.

For example, a vehicle lower structure disclosed in JP 2006-327429 A includes an under cover that constitutes the bottom surface of the engine compartment.

The under cover includes a main body portion having a plate-like shape and made of plastic (synthetic resin), and a hole is opened through the plate surface of the main body portion.

A metal lid is removably provided at the opening of the main body portion.

This configuration prevents the under cover from being damaged by the exhaust pipe and allows maintenance inside the engine compartment by simply removing the lid.

Amid calls for reducing the burden on the environment, reduction of carbon dioxide emissions has recently become imperative.

For this reason, further improvement on fuel efficiency is required in the field of automobiles as a measure to reduce carbon dioxide emissions.

In contrast, the technology disclosed in JP 2006-327429 A may inhibit the weight reduction of the vehicle and prevent the improvement on fuel efficiency because the lid is made of metal.

With the above drawbacks of the conventional structure in view, the present invention seeks to provide a vehicle lower structure that can reduce the weight while maintaining ease of maintenance work.

SUMMARY

The present invention proposed to attain the above object provides a vehicle lower structure including an under cover. The under cover comprises: a cover body located under an exhaust pipe and installed on a vehicle body; a lid detachably attached to the cover body and configured to close a work hole penetrating the cover body in an upper-lower direction when the lid is attached to the cover body and to open the work hole when the lid is detached from the cover body; and a baffle made of a metal material and installed in an area of an upper surface of the lid that includes a portion closest to the exhaust pipe and its surroundings.

DETAILED DESCRIPTION

Figure 1:
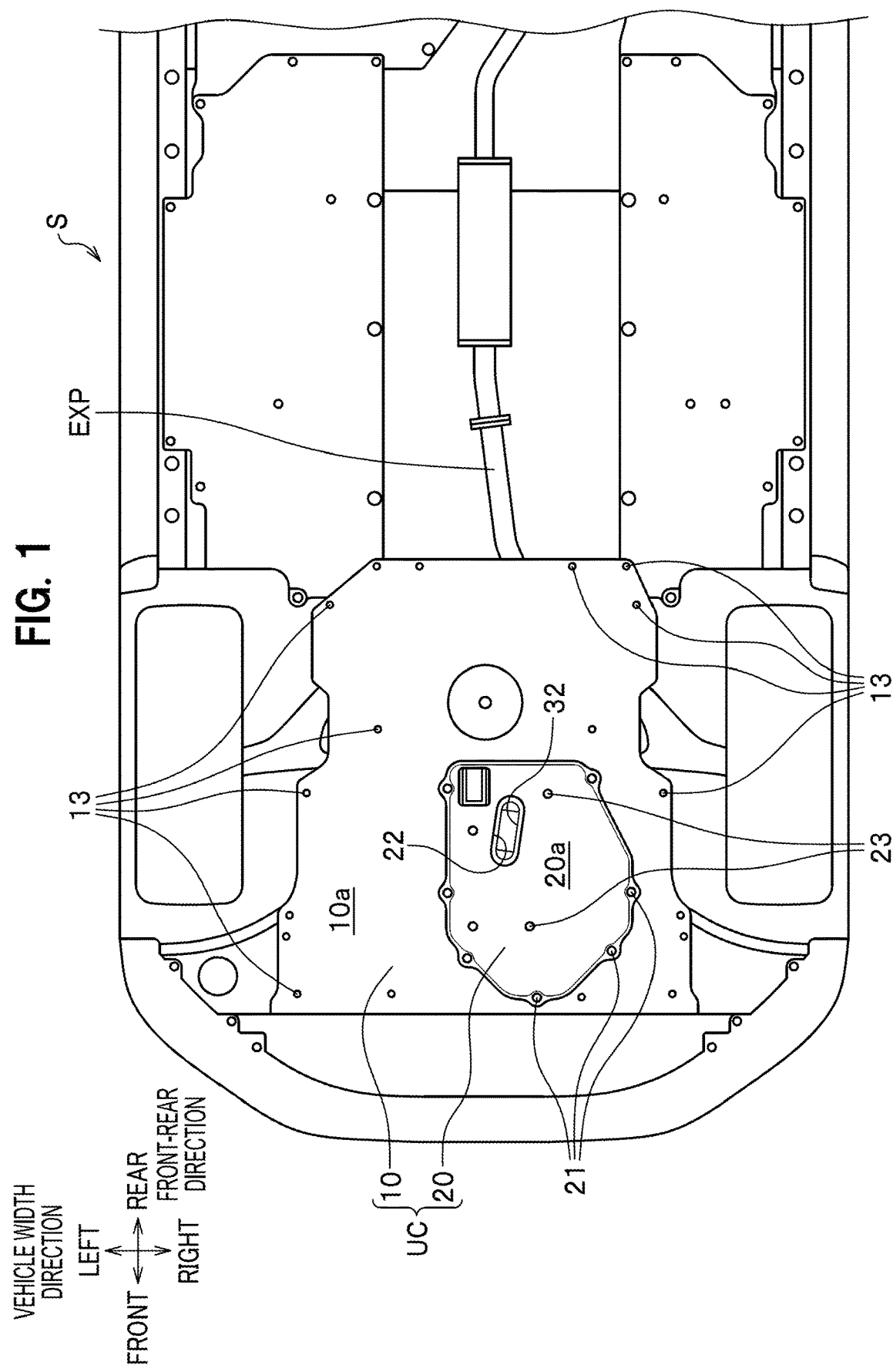
FIG. 1 is a bottom view of a vehicle with a vehicle lower structure according to one embodiment of the present invention.

With reference to FIGS. 1 through 5, a vehicle lower structure S according to one embodiment of the present invention is described in detail. In the description, the same or similar elements are designated by the same reference numerals and duplicated description thereof will be omitted.

Unless otherwise stated, front and rear directions refer to corresponding directions in the longitudinal direction (i.e., front-rear direction) of a vehicle, upper and lower directions refer to corresponding directions in the vertical direction (i.e., upper-lower direction) of the vehicle, and inner and outer directions refer to corresponding directions of the vehicle.

The vehicle lower structure S according to this embodiment is provided at a front side of a vehicle cabin and constitutes a bottom surface of a so-called engine room, in which an engine (not shown in the drawings) and other equipment are accommodated.

The vehicle lower structure S includes an under cover UC and a baffle BF.

The under cover UC is provided to protect the equipment in the engine compartment from protrusions on a road surface, and dust and sand thrown up while the vehicle is traveling.

The under cover UC includes a cover body 10 and a lid 20.

<Cover Body>

The cover body 10 is a main component of the under cover UC. The cover body 10 is fixed to a vehicle body structure (not shown in the drawings) that forms the engine compartment (see FIGS. 1 to 3).

The cover body 10 is made of a plate-like plastic material and is installed on the vehicle body such that the plate surface thereof faces up and down.

The lower surface 10a of the cover body 10 is formed as a flat surface.

The upper surface 10b of the cover body 10 has a plurality of longitudinal ribs 11 extending in the longitudinal direction and a plurality of lateral ribs 12 extending in the vehicle width direction. The longitudinal ribs 11 and the lateral ribs 12 are located at predetermined distances apart from each other.

Since the lower surface 10a of the cover body 10 is formed as a flat surface, even if protrusions on the road surface hit the cover body 10 during traveling of the vehicle, the protrusions are not caught and the vehicle can path through the protrusions.

Further, since the lower surface 10a of the cover body 10 is formed as a flat surface, the aerodynamic performance of the vehicle can be improved by regulating the air flow at the underside of the vehicle body during the traveling of the vehicle.

Further, since the longitudinal ribs 11 and the lateral ribs 12 are provided on the upper surface 10b of the cover body 10, sufficient rigidity of the cover body 10 can be ensured while reducing the weight of the cover body 10.

Figure 2:
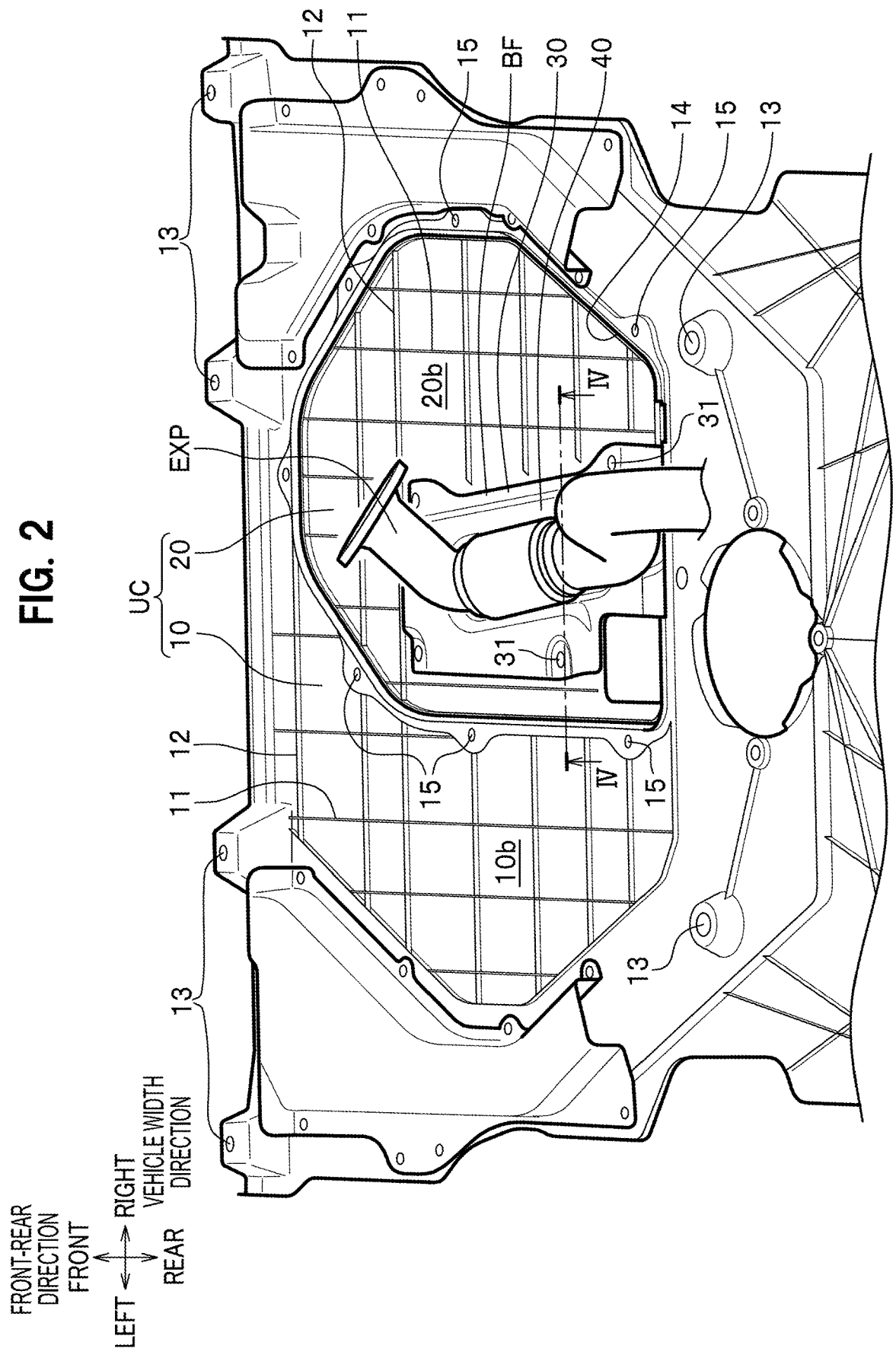
FIG. 2 is a perspective view illustrating the vehicle lower structure according to this embodiment.
Figure 3:
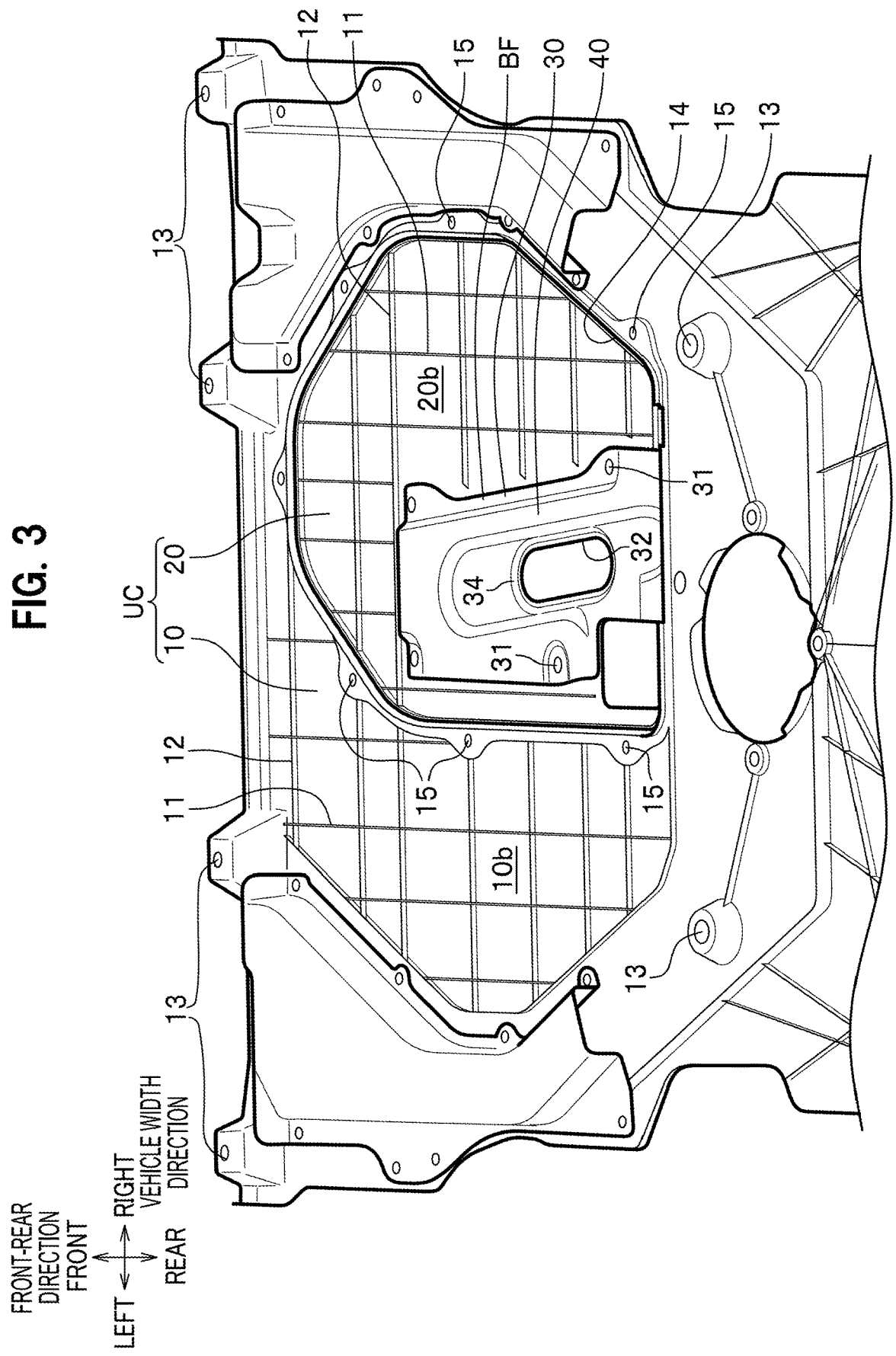
FIG. 3 is a perspective view illustrating the vehicle lower structure according to this embodiment with an exhaust pipe removed.
Figure 4:
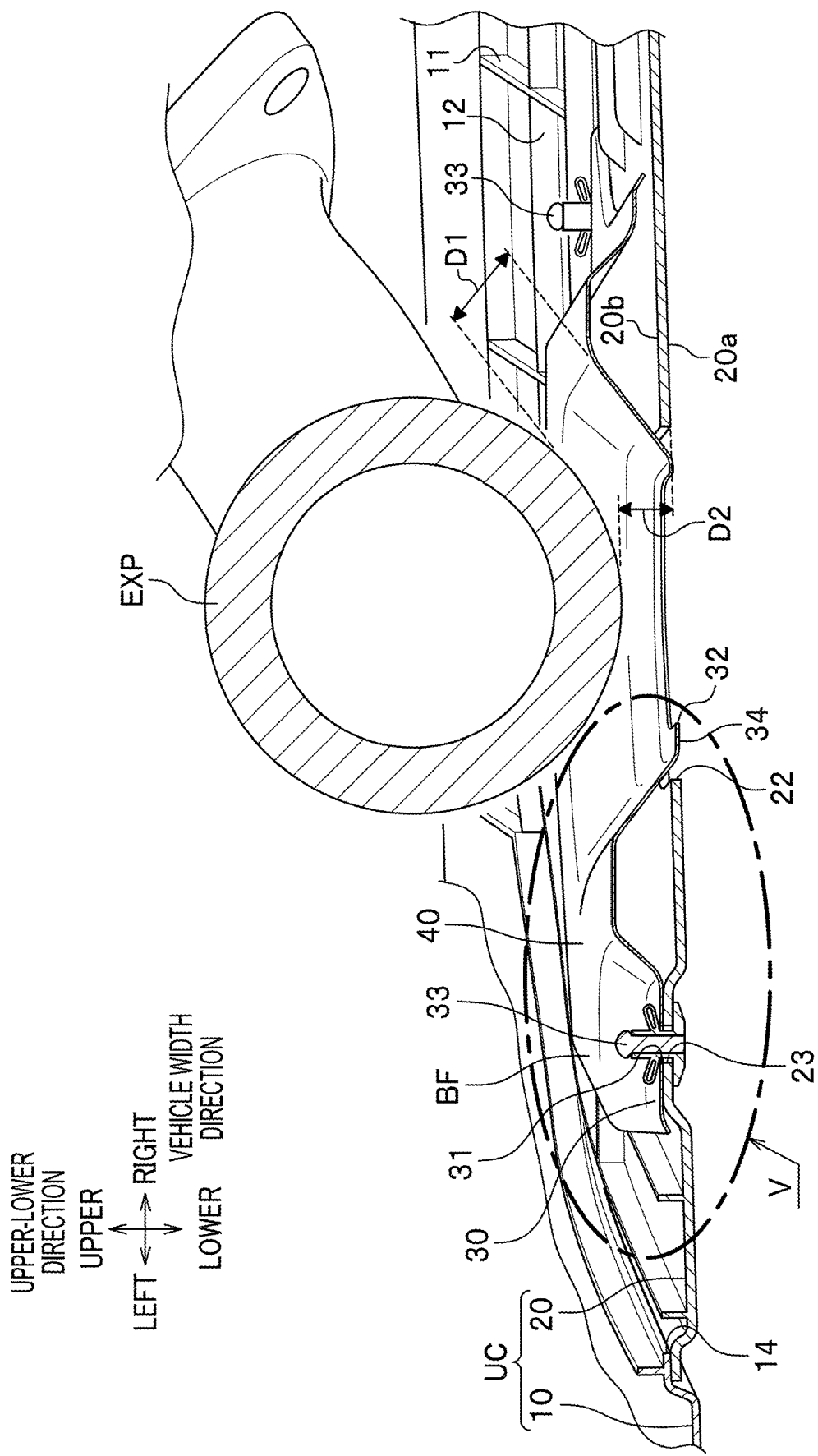
FIG. 4 is a cross-sectional view taken along the line IV-IV of FIG. 2.
Figure 5:
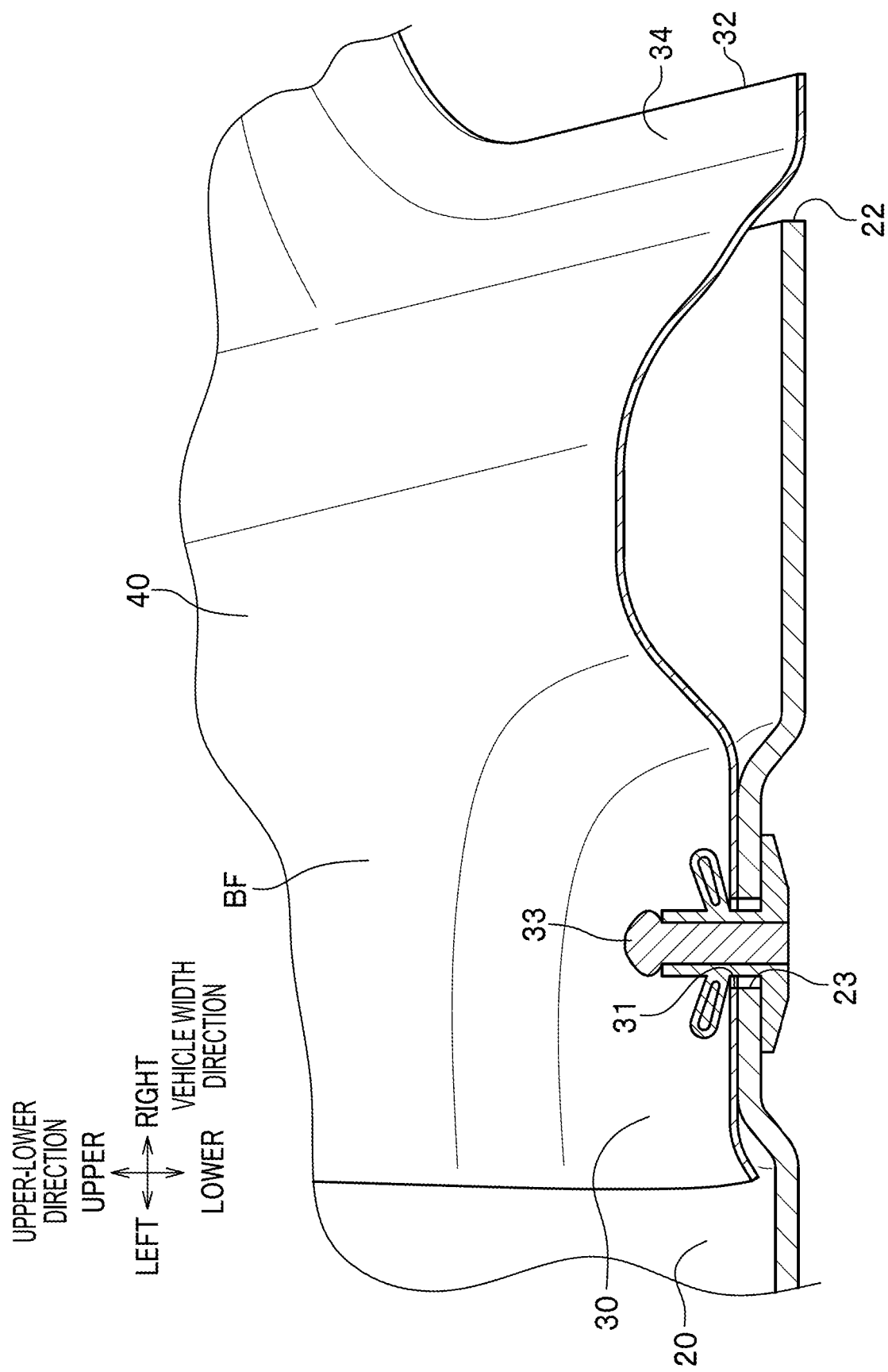
FIG. 5 is an enlarged cross-sectional view of the main part that illustrates the V portion of FIG. 4.

Further, the cover body 10 has body fixing portions 13 and a work hole 14 (see FIG. 1 to FIG. 3).

The body fixing portions 13 are provided as parts for fixing the cover body 10 to the vehicle body structure. Each body fixing portion 13 is constituted by a through hole penetrating the cover body 10 in the vertical direction.

The cover body 10 is fixed to a predetermined vehicle body structure member by bolts (not shown in the drawings) or other screw members to be inserted into the body fixing portion 13.

The work hole 14 is opened at a portion closer to a center of the cover body 10 to penetrate through the plate surface of the cover body 10.

The work hole 14 is opened to perform routine maintenance work for the equipment arranged in the engine compartment, such as changing the engine oil.

This is to improve workability without removing the cover body 10 for each maintenance work.

For this reason, the work hole 14 is opened such that the portion below the area where the work is to be performed is released.

Further, the work hole 14 is located under the exhaust pipe EXP and opened to release a portion including the portion opposite to the lowermost portion of the exhaust pipe EXP.

It should be noted that the position where the routine maintenance work is to be performed in the engine compartment and the layout of the exhaust pipe EXP may be changed due to differences in engine displacement and other factors.

For this reason, the work hole 14 is shaped and sized to correspond to the routine maintenance work and all layouts of the exhaust pipe EXP.

<Lid>

The lid 20 is configured to open and close the work hole 14 and is detachably attached to the cover body 10 (see FIG. 1 to FIG. 3).

The lid 20 closes the work hole 14 when the lid 20 is attached to the cover body 10 and opens the work hole 14 when the lid 20 is detached from the cover body 10.

The lid 20 is made of the same plastic material as the cover body 10.

The lid 20 is formed of a plate-like member that is one size larger in shape and size than the work hole 14.

Similar to the cover body 10, the lower surface 20a of the lid 20 is formed as a flat surface.

With this configuration, no difference in level is formed between the lower surface 10a of the cover body 10 and the lower surface 20a of the lid 20 when the lid 20 is attached to the cover body 10, so that a continuous flat surface is formed.

As with the cover body 10, the longitudinal ribs 11 and lateral ribs 12 are formed on the upper surface 20b of the lid 20.

Further, a baffle BF is installed on the upper surface of the lid 20.

The lid 20 has lid fixing portions 21 and a cover hole 22.

Each lid fixing portion 21 is constituted by a through hole penetrating the peripheral edge portion of the lid 20 in the vertical direction.

The lid fixing portions 21 are fixed to the cover-side lid fixing portions 15 provided in the cover body 10 by lid fixing members (not shown in the drawings).

A combination of external threads (male threads) and internal threads (female threads) may be used as the lid fixing members. For example, the external threads such as bolts are inserted into the lid fixing portions 21 and then screwed into the internal threads (not shown in the drawings) such as nuts provided on the cover-side lid fixing portions 15.

The lid fixing members are not limited to the screw members configured as described above. As long as the lid 20 can be detachably fixed to the cover body 10, any known configurations may be used as the lid fixing members where appropriate.

When the lid 20 is assembled with the cover body 10, the lid 20 is placed under the cover body 10 from below and fixed thereto using the lid fixing members.

The cover hole 22 vertically penetrates a portion of the lid 20 at which the lid 20 and the exhaust pipe EXP are the closest to each other.

Further, the cover hole 22 is opened to have a shape and size that allows a portion of the exhaust pipe EXP adjacent to the lid 20 to be inserted and extend through the cover hole 22.

In other words, the cover hole 22 is an oblong shape that allows the lowermost portion of the exhaust pipe EXP to extend through the cover hole 22 and protrude downward from the under cover UC when the under cover UC is fixed to the vehicle body.

It should be noted that the cover hole 22 is opened at a corresponding position of the lid 20 for each layout of the exhaust pipe EXP.

In other words, differences in the layout of the exhaust pipe EXP can be overcome by selecting the corresponding lid 20.

<Baffle>

The baffle BF is provided as a heat blocking device. The baffle BF blocks radiant heat radiated from the exhaust pipe EXP toward the lid 20 and prevents thermal degradation of the lid 20 (see FIG. 3 to FIG. 5).

The baffle BF is installed in an area of the upper surface of the lid 20 that includes a portion closest to the exhaust pipe EXP and its surroundings.

The baffle BF includes a baffle body 30, baffle fixing portions 31, a baffle hole 32, and a bead portion 40.

The baffle body 30 is made of a plate-like metal material and faces up and down.

The baffle fixing portions 31 are arranged at peripheral edge portions of the baffle body 30. Each baffle fixing portions 31 is constituted by a through hole penetrating the baffle body 30 in the vertical direction.

The baffle fixing portions 31 are fixed to the lid-side baffle fixing portions 23 provided in the lid 20 by rivets 33 (baffle fixing members).

The baffle hole 32 is constituted by a through hole penetrating the baffle body 30 in the vertical direction and communicating with the cover hole 22.

The baffle hole 32 is formed of an oblong through hole that is one size smaller than the cover hole 22.

The peripheral edge portion 34 of the baffle hole 32 is formed of a flange-like flat surface. The peripheral edge portion 34 is disposed within the cover hole 22.

In other words, the peripheral edge portion 34 of the baffle hole 32 constitutes a flat surface continuous with the lower surface 20a of the lid 20.

The bead portion 40 is formed by press working applied to the baffle body 30. The bead portion 40 protrudes upward from the peripheral edge portion 34 of the baffle hole 32 of the baffle body 30.

Further, the bead portion 40 surrounds an area around the lowermost portion of the exhaust pipe EXP.

The bead portion 40 is interposed between rivets 33, by which the baffle BF is fixed to the under cover UC, and the exhaust pipe EXP.

In other words, the baffle hole 32 is opened at a central portion of the bead portion 40, and the bead portion 40 is formed and disposed to surround an area around the baffle hole 32.

The bead portion 40 is formed such that the peripheral edge portion of the baffle BF is spaced apart from the lid 20 except at the right side edge portion and at peripheries of the baffle fixing portions 31.

This can reduce heat transferred from the baffle BF to the lid 20.

It should be noted that at the right side of the baffle hole 32, the bead portion 40 is formed to have a generally trapezoidal cross-section and the right side edge portion of the bead portion 40 contacts the upper surface 20b of the lid 20.

This makes it possible to enhance the rigidity of the baffle fixing portions 31 as compared with an alternative configuration in which the peripheral edge portion of the baffle BF is spaced apart from the lid 20 (as with the configuration at the left side of the baffle hole 32).

Since the rigidity of the baffle fixing portions 31 has been enhanced, the rigidity of the right side portion of the baffle hole 32 in the lid 20 can be further enhanced.

In contrast, at the left side of the baffle hole 32, the peripheral edge portion of the lid 20 is adjacent to the baffle fixing portions 31.

With this configuration, even if the peripheral edge portion of the baffle BF is configured to be spaced apart from the lid 20, the lid 20 can satisfy the requirements of the rigidity.

Accordingly, the configuration in which the peripheral edge portion of the baffle BF is spaced apart from the lid 20 is employed at the left side of the baffle hole 32 in order to give higher priority to heat blocking property relative to the lid 20 rather than rigidity.

Further, since the configuration in which the peripheral edge portion of the baffle BF is spaced apart from the lid 20 is employed at the left side of the baffle hole 32, the press die having more simple structure can be used to prevent the press forming process for the baffle BF from being complicated.

Advantageous effects of the vehicle lower structure S according to this embodiment will be described below.

According to the vehicle lower structure S of this embodiment, the baffle BF is disposed on the upper surface 20b of the lid 20 that is disposed to open and close the work hole 14.

The baffle BF is made of a plate-like metal material and is disposed in an area of the upper surface 20b of the lid 20 that includes a portion closest to the exhaust pipe EXP and its surroundings.

This configuration make is possible to reduce the amount of metal used as compared with an alternative configuration in which the under cover UC and the lid 20 are entirely made of metal.

With this configuration, the weight and the cost of the vehicle lower structure S can be reduced.

According to the vehicle lower structure S of this embodiment, the cover hole 22 is opened at a portion of the lid 20 that is closest to the lowermost portion of the exhaust pipe EXP.

Further, the baffle BF has the baffle hole 32 opened to communicate with the cover hole 22.

To suppress deterioration of the under cover UC due to heat from the exhaust pipe EXP, it is necessary that the exhaust pipe EXP and the lid 20 be spaced apart at least by a predetermined dimension.

If the cover hole 22 and the baffle hole 32 are not opened, a portion (distance) D2 between the upper surface 20b of the lid 20 and the lowermost portion of the exhaust pipe EXP is the narrowest.

Therefore, the distance of this portion D2 is set to the predetermined dimension or greater.

In contrast, if the cover hole 22 and the baffle hole 32 are opened, the lid 20 does not have a portion located opposite to the lowermost portion of the exhaust pipe EXP.

For this reason, the exhaust pipe EXP and the lid 20 are closest to each other at a portion (distance) D1 between a portion of the bead 40 that rises from the lid 20 and a portion of the exhaust pipe EXP that is opposite to this rising portion of the bead 40.

This makes it possible to reduce the distance of the portion D2 between the upper surface 20b of the lid 20 and the lowermost portion of the exhaust pipe EXP.

In other words, providing the cover hole 22 and the baffle hole 32 makes it possible to improve the degree of freedom in the location of the under cover UC.

Further, according to the vehicle lower structure S of this embodiment, the baffle BF installed on the lid 20 has a bead portion 40 protruding upward.

This configuration improves the rigidity of the baffle BF, so that even if the exhaust pipe EXP comes into contact with the baffle BF during traveling of the vehicle, it is possible to prevent damage to the baffle BF.

Further, according to the vehicle lower structure S of this embodiment, the bead portion 40 is formed and interposed between the rivets 33 (baffle fixing members) and the exhaust pipe EXP.

With this configuration, the bead portion 40 can block radiant heat radiated from the exhaust pipe EXP.

Accordingly, heat is less likely to be transferred to the rivets 33, so that it is possible to prevent thermal degradation of the lid 20 that is made of a plastic material (e.g., melting of the lid 20) due to heated rivets 33.

What is claimed is:

1. A vehicle lower structure including an under cover, wherein the under cover comprises:
   a cover body located under an exhaust pipe and installed on a vehicle body;
   a lid detachably attached to the cover body and configured to close a work hole penetrating the cover body in an upper-lower direction when the lid is attached to the cover body and to open the work hole when the lid is detached from the cover body; and
   a baffle made of a metal material and installed in an area of an upper surface of the lid that includes a portion closest to the exhaust pipe and its surroundings.

2. The vehicle lower structure according to claim 1, wherein
   the lid has a cover hole constituted by a through hole opened at the portion closest to the exhaust pipe, and
   the baffle has a baffle hole opened to communicate with the cover hole.

3. The vehicle lower structure according to claim 1, wherein the baffle has a bead portion protruding upward.

4. The vehicle lower structure according to claim 3, wherein the bead portion protrudes from the baffle and is interposed between a baffle fixing member, by which the baffle is fixed to the lid, and the exhaust pipe.

* * * * *